July 24, 1951 F. C. MINARDI 2,562,112

PHONOGRAPH RECORD HOLDER

Filed Nov. 13, 1948 2 Sheets-Sheet 1

INVENTOR.
Frank C. Minardi
BY
Sheridan, Davis & Cargill
Att'ys

July 24, 1951 F. C. MINARDI 2,562,112
PHONOGRAPH RECORD HOLDER
Filed Nov. 13, 1948 2 Sheets-Sheet 2
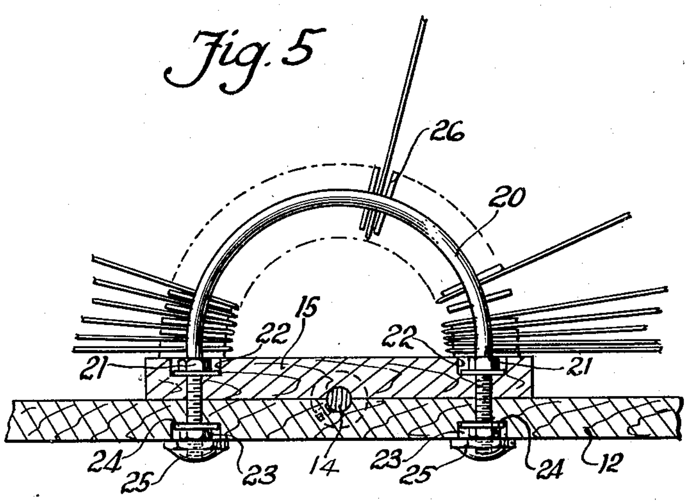
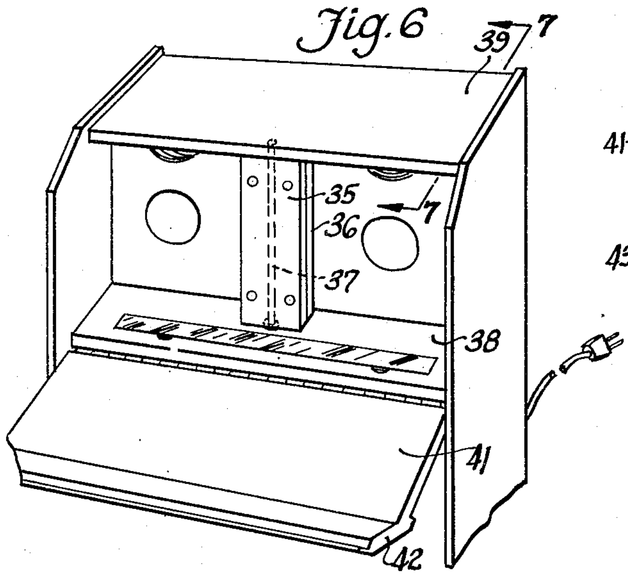
Fig. 7
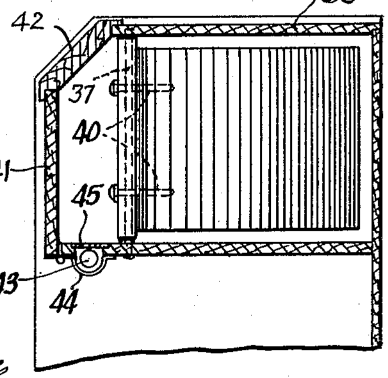
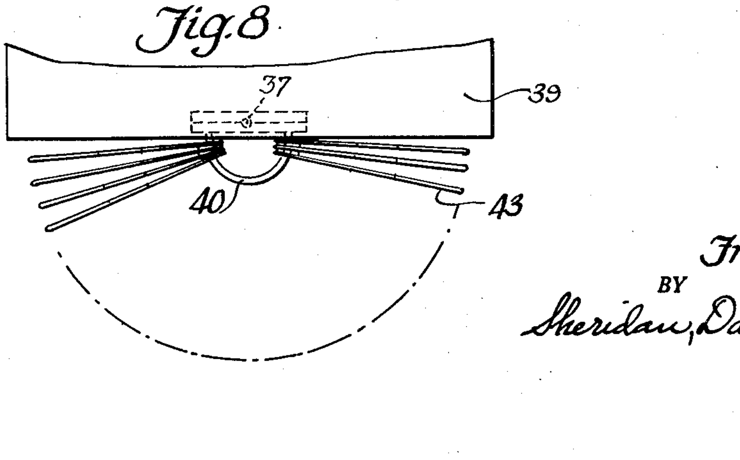
INVENTOR.
Frank C. Minardi
BY
Sheridan, Davis & Cargill
Att'ys Patented July 24, 1951 2,562,112

UNITED STATES PATENT OFFICE 2,562,112

PHONOGRAPH RECORD HOLDER

Frank C. Minardi, Chicago, Ill., assignor of one-half to Arthur J. Feigel, Chicago, Ill.

Application November 13, 1948, Serial No. 59,885

5 Claims. (Cl. 312—11)

This invention relates to improvements in phonograph record holders.

One object of the invention is to provide a holder for phonograph records of disk form that enables a relatively large number of records to remain readily available for convenient use, as contrasted with holders in the form of conventional record albums which require, generally, the removal of the albums from cabinets or shelves in making a selection of records to be played and requiring, also, the replacement of the albums following restoration of the played records therein.

Another object of the invention is to provide a disk record holder in a cabinet therefor in which the holder is pivotally supported whereby the holder may be swung about the pivot to place all the records simultaneously in positions of convenient access for removal from the holder without obstruction by superjacent portions of the cabinet.

An additional object of the invention is to provide a record holder comprising a plurality of open top flexible envelopes, each for holding individual record, and comprising improved means for releasably attaching the envelopes to a support that distributes the load on each envelope to the entire length of the attached edge thereof for increasing the period of usefulness of the envelopes and for retaining them in uniformly spaced relation at the opposite edges for convenience in leafing the envelopes while making a selection of records to be played.

Additional objects of the invention relate to various features of construction and arrangement of parts which would be apparent from a consideration of the following specification and accompanying drawings disclosed in structures which are illustrative of the present invention.

In the drawings:

Fig. 5 is a sectional view taken on line 5—5 of Fig. 4.

Fig. 6 is a perspective view of a different type cabinet having the improved record holder embodied therein.

Fig. 7 is a broken sectional view taken on line 7—7 of Fig. 6 but showing the closure member in closed position.

Fig. 8 is a broken top plan view of the cabinet shown in Fig. 6 illustrating the record holder in outer position.

Figures 1, 2, 4:
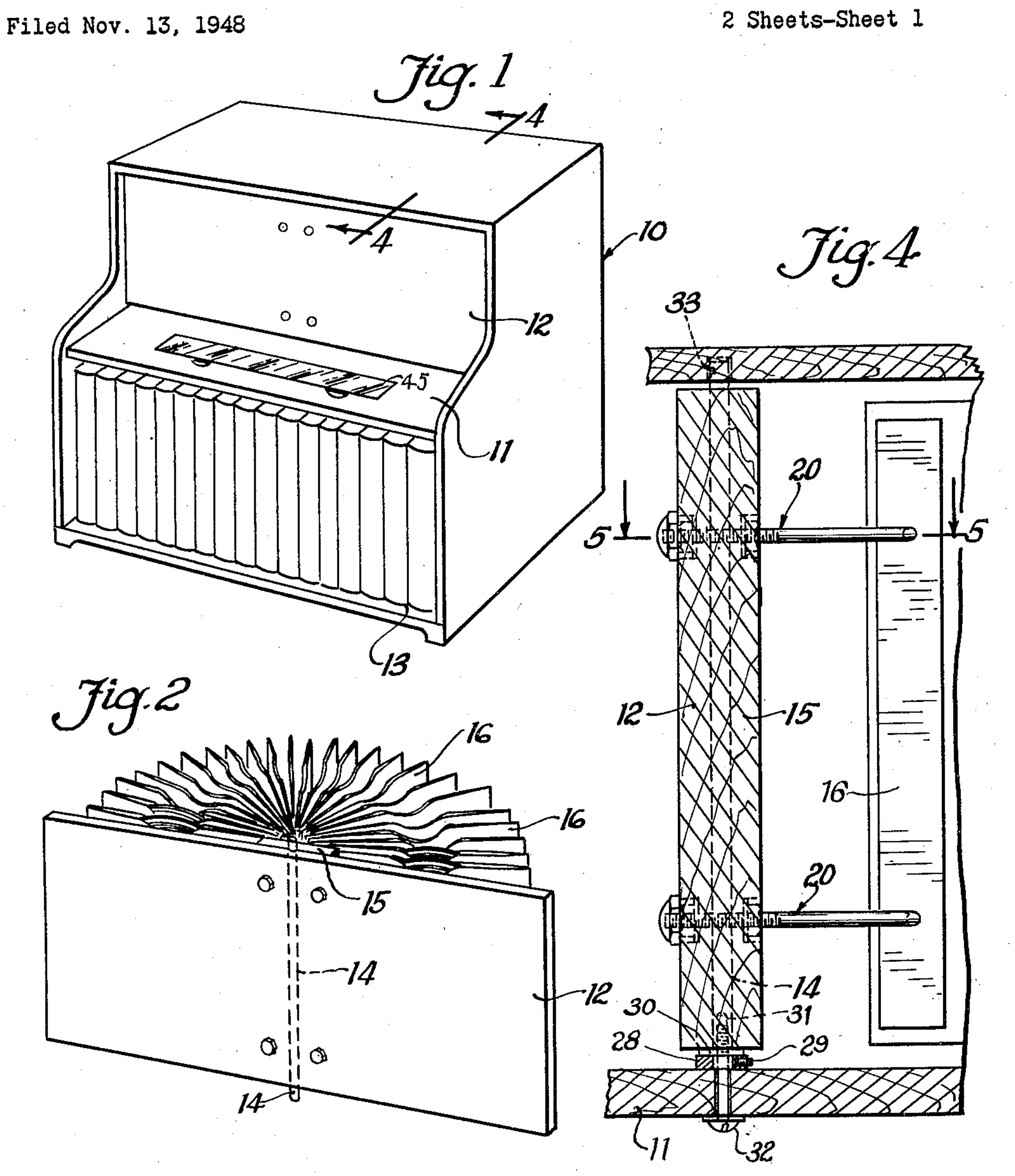
Figure 1 is a perspective view of a cabinet having embodied therein a record holder constructed in accordance with the present invention.
Fig. 2 is a perspective view of a detached record holder of the type employed in the cabinet shown in Fig. 1.
Fig. 4 is a sectional view taken on line 4—4 of Fig. 1 showing the holder with some of the envelopes removed therefrom.

In Fig. 1 of the drawings, a cabinet 10 is shown for the purpose of illustrating merely a type of cabinet with which the present improvements may be employed. The particular cabinet shown is inwardly offset adjacent an upper compartment, the base of which is indicated at 11 and having a front closure member 12 which constitutes a portion of the improved record holder. As suggested, the cabinet may be of any suitable form, Fig. 1 showing a second compartment for holding record albums, books, or the like, beneath the shelf or base 11, the second compartment being indicated by numeral 13, but forming no part of the present improvements.

The closure member 12, as shown in Fig. 2, carries a pivot member in the form of a rod 14, which projects above and below the upper and lower longitudinal edges of the member 12. The pivot member 14 may be secured to the closure member 12 by any improved means, but in the structure illustrated it is seated in a groove or bore provided partially in the inner face of the member 12 and partially in the contacting face of a cooperating strip 15.

Figure 3:
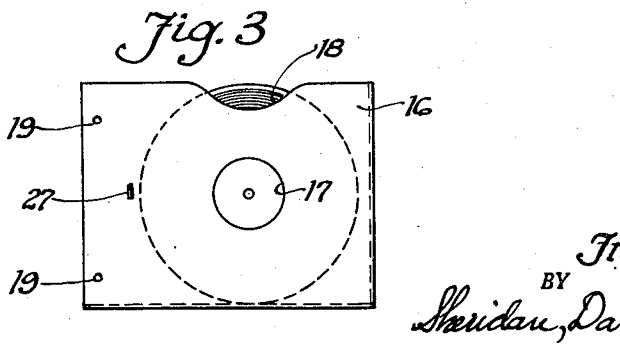
Fig. 3 is a front elevation of a record holding envelope detached from the holder shown in Fig. 2.

Attached inwardly of the closure member 12 is a plurality of open top envelopes 16 each adapted for receiving a disk phonograph record. As shown in Fig. 3, the envelopes are provided with circular openings 17 which reveal the conventional center label attached to phonograph records and generally bearing the title of the recorded selection, and is provided at the upper edge with a cut-out 18 which provides ready access to a portion of the record in removing the same from the envelope. Each envelope likewise is provided with spaced perforations 19 at the bound edge thereof. The perforations 19 provide means for stringing the envelopes upon a pair of U shaped clamp members indicated generally by numerals 20. The ends of the arms of the U shaped clamp members 20 are threaded and are adapted to extend through openings provided in the closure member 12 and the reinforcing strip 15 which may be glued or otherwise attached to the member 12. Each arm of the members 20 is provided with nuts 21 which seat within recesses 22 provided in the inner face of the member 15 as shown in Fig. 5. The outer end portions of the arms are adapted to receive nuts 23, which seat in recesses 24 provided in the outer surface of the closure member 12. The nuts of each arm are adapted for cooperation in clamping the respective arms firmly in position for supporting the U shaped members in horizontal positions extending inwardly of the closure member. Over the outer ends of the arms there is provided preferably an ornamental nut or finial 25.

Before assembling the U shaped clamps on the closure member, the record envelopes 16 are strung on the clamp members with spacers 26 disposed on each side of the several envelopes. The spacers may be of cardboard, fiber or other like material in strip form, suitably perforated at distances corresponding to the vertical spacing between the clamp members 20. The spacers 26 are approximately of the thickness of a phonograph record or the combined thickness of a phonograph record and the envelope 26 in which it is contained. The envelopes and spacers are packed tightly together on the curved portion of the clamps, after which the nuts 21 are adjusted in proper positions on the arms of the clamps, and the clamps, with the envelopes and spacers thereon, are mounted on the closure member 12. The tight placing together of the mounted edges of the envelopes provides, in effect, a continuous binding extending vertically along the stationary edges of the envelopes, and thus, relieves the perforated portions of the envelopes from the strain that would be imposed only on said perforated portions by the weight of the contained records. The durability of the envelopes is thus greatly increased. Likewise, the spacers between the envelopes space the envelopes apart sufficiently to avoid the pinching of the records within the envelopes, since the adjacent peripheral portion of a record in an envelope, as viewed in Fig. 3, is located outwardly of the respective spacers leaving a space between the bound edge and the adjacent portion of a record that constitutes a hinge. Hence, the records can be removed freely from their respective envelopes notwithstanding the fact that the inner edges of the envelopes are bound firmly together upon the clamps 20. If desired, a staple 27, or like element, can be provided in each envelope, as shown in Fig. 3, for preventing the records from being displaced inwardly sufficiently from a normal position concentric with the openings 17 as to be broken or bent when the envelopes are flexed in leafing through a group of supported envelopes in making record selections.

As shown in Fig. 4, the pivotal member 14 preferably is provided with a bushing 28 adjacent its lower end which seats on the surface of the compartment base 11, and which is secured to the pivot member by a set screw 29. A washer 30 may be used on the upper surface of the bushing, if desired. The bushing spaces the lower edge of the closure member 12 from the member 11 as shown in Fig. 4. The lower end of the pivotal rod 14 is provided with a threaded recess 31 for receiving an attaching screw 32. The upper end of the pivot member 14 may seat within a recess 33 provided in the top wall of the cabinet. The pivot rod 14 thus is held stationary by the screw 32, the closure member pivoting relatively on the rod. Other suitable pivoting arrangements for the closure member may be provided if desired.

In the use of the structure shown in Fig. 1, it is only necessary to press on the closure member at one side of its pivotal axis to swing the group of record holding envelopes to the outer position, such as is indicated in Fig. 8, thereby rendering accessible all the records carried by the holder.

A holder of the type described may, as a practical matter, accommodate easily a hundred envelopes and thus, a hundred records. Inasmuch as such a group of records has considerable weight, the cabinet 10 preferably is provided with the offset above referred to for the purpose of avoiding unbalancing the cabinet and possibly causing it to tip when the records are swung to the outer position. However, the use of a cabinet having such offset is not essential since a cabinet of the type shown in Figs. 6 and 7 may be employed in conjunction with the record holder if desired.

In the type of cabinet shown in Fig. 6, the record holder does not carry a closure member for the opening of the record holder compartment. In the holder shown in Figs. 6, 7, and 8 a pair of members, which may be of wood, and indicated by numerals 35 and 36, are provided therebetween with a pivotal member 37 corresponding to the member 14 above described. The ends of the member 37 may be mounted in the base 38 and top 39 of a record holding compartment of the cabinet similarly to the mounting of pivot member 14. Members 35 and 36 carry a pair of clamp members 40 of U shape and corresponding to the clamps 20 shown in Figs. 4. The cabinet illustrated is provided with a drop-leaf or closure member 41, the outer edge of which is provided with an angular panel 42 which, when closed as shown in Fig. 7, extends angularly into contact with the forward edge of the top 39. When the closure 41 has been lowered to the position shown in Fig. 6, the pivotal record carrier can be turned to move all the record holding envelopes 43 to a position of access as shown in Fig. 8. The particular cabinet construction described enables the pivot 37 to be located a substantial distance inwardly from the front face of the cabinet to avoid over-balancing of the latter when the records are swung to the accessible position shown in Fig. 8.

In the bottom panels or lower portions 11 and 38 of the record holding compartments of Figs. 1 and 6, respectively, there may be provided a recess for holding a fluorescent tube 43, or other lighting element, provided with a reflector 44 beneath the same, and a transparent panel 45 flush with the upper surface of the respective members 11 and 38. When the respective record holder is swung to the outer position and the respective lamps are illuminated, light passes upwardly between the envelopes for facilitating the reading of the titles of the records contained in the envelopes.

When the holder is in an outer position, the envelopes can be flexed or swung to one side or the other in leafing through the group of envelopes in making the desired selections, the envelopes being preferably of paper and the portions between the vertical bound edges and the staples 27 constituting the hinge portions. When the records have been restored to their respective envelopes, the holder can be rotated upon its axis to return the records into the holding compartment of the cabinet. The improvements thus make accessible for convenient use a large group of records without the necessity for handling them individually or in smaller groups such as is necessary where records are stored in albums, for example.

While I have shown and described structures which are illustrative of the invention, I do not wish to be restricted specifically to the details of the structures shown since variations thereof may be made within the scope and spirit of the invention defined by the appended claims.

I claim:

1. A holder for disc type phonograph records comprising a plurality of open top record receiving envelopes each provided with bolt receiving apertures adjacent one end thereof, a vertical support, bolts carried by the support and provided with horizontally disposed arcuate portions passing through the apertures for disposing the envelopes in vertical relation, spacer members disposed on the bolts between adjacent records corresponding in thickness substantially to the thickness of the records, and nuts on the bolts for drawing the U shaped portions thereof toward the support for clamping firmly together on said U shaped portions the supported ends of the envelopes and the intermediate spacers to provide a binding that engages opposed surfaces of the supported envelopes in areas coextensive with the contacting areas of the spacers.

2. A holder for disc type phonograph records comprising a plurality of open top record receiving envelopes each provided with bolt receiving apertures adjacent one end thereof, a vertical support, bolts carried by the support and provided with horizontally disposed arcuate portions passing through the apertures of the envelopes for disposing the envelopes in vertical relation, spacers on the arcuate portions of the bolts disposed between adjacent envelopes, and means for drawing said arcuate portions toward the support for clamping firmly together on said arcuate portions the supported ends of the envelopes and said spacers to provide a binding that engages the opposed surfaces of the envelopes in areas coextensive with the contacting areas of the spacers, said spacers being of a thickness corresponding substantially to that of the records for insuring expansion space between adjacent envelopes along the portions thereof contiguous to the respective spacers.

3. A holder for disc type phonograph records comprising a cabinet providing a record storage space having an opening in the front and a communicating opening in the adjacent portion of the top thereof, a closure for the front opening hinged along the lower edge thereof to the cabinet for movement from an upright closed position to a lower position and provided with an extension along the upper edge thereof that closes said top opening when the closing member is in closed position, an envelope supporting member extending vertically of said storage space in a plane disposed rearwardly of said top opening and being pivotally attached to the cabinet for swinging movement on a vertical axis, and a plurality of vertically disposed open top record holding envelopes each attached at one edge thereof to the rear of said supporting member in positions arranged substantially radially of said axis and adapted to be moved pivotally as a unit with said support from a storage position within the space when the closure member is open to outer position from which unobstructed vertical removal of the records from the envelopes is accommodated by the upper extension of said opening.

4. A holder for disc type phonograph records comprising a cabinet storage space having an opening in a vertical wall of the cabinet, a vertical supporting member in said opening, upper and lower U shaped rods each provided with a semi-circular intermediate portion and parallel threaded end portions carried by said supporting member in horizontal planes with the semi-circular portions vertically aligned at one side of the supporting member and with the threaded ends extending through the supporting member, a plurality of record receiving envelopes each having rod receiving perforations adjacent one end, vertically arranged spacers each having rod receiving perforations, said envelopes and spacers being strung on said semi-circular portions of the rod in alternating relation, nuts on said threaded ends of the rods for drawing the semi-circular portions thereof toward the adjacent face of the supporting member for compacting the envelopes and spacers one against the other to provide a rigid binding for the perforated ends of the envelopes coextensive with the contacting spacers, and means pivotally supporting said supporting member in said opening to enable the same to be swung to position for moving the envelopes into and from said storage space.

5. In a holder for disc type phonograph records, a vertical support, a plurality of open top record receiving envelopes each provided with rod receiving perforations at one end, rods having semi-circular portions extending through the perforations of the envelopes for disposing the envelopes in vertical radial planes, apertured spacers on the semi-circular portions of the rods between adjacent envelopes for spacing the envelopes apart at the attached ends thereof to provide expansion spaces at each side of each envelope at portions thereof immediately contiguous to said spacers, and nuts on the rods cooperating with the support for drawing the semi-circular portions thereof toward the support for effecting the compacting of the attached ends of the envelopes and spacers firmly together and against the support to provide a frictional binding for the envelopes at said attached ends thereof.

FRANK C. MINARDI.

REFERENCES CITED

The following references are of record in the file of this patent:

UNITED STATES PATENTS

| Number | Name | Date |
|---|---|---|
| 628,943 | Kasik | July 18, 1899 |
| 765,494 | Krom | July 19, 1904 |
| 934,888 | Dahlberg | Sept. 21, 1909 |
| 1,495,152 | Becker | May 27, 1924 |
| 1,785,988 | Sutcliffe | Dec. 23, 1930 |
| 2,099,472 | Emery | Nov. 16, 1937 |